US011518510B1

(12) United States Patent
Gohl et al.

(10) Patent No.: US 11,518,510 B1
(45) Date of Patent: Dec. 6, 2022

(54) SYSTEMS AND METHODS FOR CONTROLLING AN UNMANNED AERIAL VEHICLE

(71) Applicant: GOPRO, INC., San Mateo, CA (US)

(72) Inventors: Pascal Gohl, Zurich (CH); Sammy Omari, Winterthur (CH)

(73) Assignee: GoPro, Inc., San Mateo, CA (US)

( * ) Notice: Subject to any disclaimer, the term of this patent is extended or adjusted under 35 U.S.C. 154(b) by 678 days.

(21) Appl. No.: 15/287,702

(22) Filed: Oct. 6, 2016

(51) Int. Cl.
 *B64C 39/02* (2006.01)
 *G08G 5/00* (2006.01)
(52) U.S. Cl.
 CPC ........... *B64C 39/024* (2013.01); *G08G 5/003* (2013.01); *G08G 5/0069* (2013.01); *B64C 2201/024* (2013.01); *B64C 2201/108* (2013.01); *B64C 2201/141* (2013.01)
(58) Field of Classification Search
 CPC ........... B64C 39/024; B64C 2201/108; B64C 2201/024; B64C 2201/141; G08G 5/0069; G08G 5/003; G08G 5/006
 See application file for complete search history.

(56) References Cited

U.S. PATENT DOCUMENTS

| | | | | |
|---|---|---|---|---|
| 9,412,278 | B1* | 8/2016 | Gong | G06F 16/29 |
| 2014/0316616 | A1* | 10/2014 | Kugelmass | G05D 1/101 |
| | | | | 701/8 |
| 2016/0189548 | A1* | 6/2016 | Thurling | G08G 5/0021 |
| | | | | 701/3 |
| 2016/0373699 | A1* | 12/2016 | Torres | G05D 1/0038 |
| 2017/0031355 | A1* | 2/2017 | Jung | H04N 7/183 |
| 2017/0187993 | A1* | 6/2017 | Martch | B64C 39/024 |
| 2017/0248969 | A1* | 8/2017 | Ham | B64C 39/024 |
| 2017/0270314 | A1* | 9/2017 | Tsybrovskyy | G06F 21/6227 |
| 2018/0025649 | A1* | 1/2018 | Contreras | G05D 1/0033 |
| | | | | 701/3 |
| 2018/0033244 | A1* | 2/2018 | Northrup | G07F 17/3244 |
| 2018/0068567 | A1* | 3/2018 | Gong | H04W 4/022 |
| 2018/0088596 | A1* | 3/2018 | Cheng | B64C 39/024 |
| 2018/0265194 | A1* | 9/2018 | Gauglitz | G06Q 50/10 |
| 2018/0308367 | A1* | 10/2018 | Zhang | G05D 1/101 |
| 2018/0356842 | A1* | 12/2018 | Tankersley | H04N 5/23299 |
| 2018/0370630 | A1* | 12/2018 | Zhao | B64C 39/024 |
| 2019/0067812 | A1* | 2/2019 | Abuasabeh | H01Q 3/08 |
| 2019/0096266 | A1* | 3/2019 | Liu | B64C 39/024 |
| 2019/0174149 | A1* | 6/2019 | Zhang | B64C 39/024 |
| 2019/0235502 | A1* | 8/2019 | Lindsey | B64C 29/00 |
| 2019/0278897 | A1* | 9/2019 | Zhang | B64C 39/024 |
| 2021/0065564 | A1* | 3/2021 | Vacek | G06K 9/6259 |

* cited by examiner

*Primary Examiner* — Peter D Nolan
*Assistant Examiner* — Michael F Whalen
(74) *Attorney, Agent, or Firm* — Young Basile Hanlon & MacFarlane, P.C.

(57) ABSTRACT

This disclosure relates to systems and methods for controlling an unmanned aerial vehicle. Boundaries of a user-defined space may be obtained. The boundaries of the user-defined space may be fixed with respect to some reference frame. A user-defined operation associated with the user-selected space may be obtained. Position of the unmanned aerial vehicle may be tracked during an unmanned aerial flight. Responsive to the unmanned aerial vehicle entering the user-defined space, the unmanned aerial vehicle may be automatically controlled to perform the user-defined operation.

20 Claims, 6 Drawing Sheets

SYSTEMS AND METHODS FOR CONTROLLING AN UNMANNED AERIAL VEHICLE

FIELD

The disclosure relates to systems and methods for controlling an unmanned aerial vehicle based upon previously defined operations for specific locations into which the aerial vehicle travels.

BACKGROUND

Unmanned aerial vehicles, or UAVs, may be equipped with automated flight control, remote flight control, programmable flight control, other types of flight control, and/or combinations thereof. Some UAVs may include sensors, including but not limited to, image sensors configured to capture image information. UAVs may be used to capture special moments, sporting events, concerts, etc. UAVs may be preconfigured with particular flight control settings. The preconfigured flight control settings may not be individualized based upon boundaries of geographical locations.

SUMMARY

The disclosure relates to controlling an unmanned aerial vehicle ("UAV") based upon previously defined operations for specific locations into which the unmanned aerial vehicle travels, in accordance with one or more implementations. The locations may be user-defined. For example, a user may define boundaries to define a space at a location. The boundaries of the user-defined space may be fixed with respect to some reference frame, such as the geography of the Earth. An operation to be performed by the UAV may be associated with the user-defined space. This association may be, for example, a result of user definition. The user-defined operation may include an aerial maneuver, such as an aerobatics trick, a capture operation, such as zooming in or out of a shot, and/or other user-defined operations. A position of the UAV may be tracked during an unmanned aerial flight. Responsive to the UAV entering the user-defined space, the UAV may be automatically controlled to perform the user-defined operation.

In some implementations, a system configured to control an unmanned aerial vehicle may include one or more servers. The server(s) may be configured to communicate with one or more client computing platform(s) according to a client/server architecture. The users of the system may access the system via client computing platform(s). The server(s) may be configured to execute one or more computer program components. The computer program components may include one or more of a boundary component, an operation component, a position component, a feedback component, a control component, and/or other components.

The boundary component may be configured to obtain boundaries of a user-defined space. The boundaries of the user-defined space may be fixed with respect to some reference frame. The reference frame may be the geography of the Earth. The reference frame may include a coordinate system. For the example, the coordinate system may include the Cartesian coordinate system, the polar coordinate system, and/or other coordinate systems. The boundary component may receive a location where the UAV may be in operation via a user input. The user input may be received from one or more client computing platform(s). The boundary component may be configured to automatically determine the location based upon a location of one or more client computing platform(s) via a GPS and/or other location tracking system associated with one or more client computing platform(s). The boundary component may be configured to automatically determine the location based upon a location of the UAV via a GPS and/or other location tracking system associated with the UAV. The location may include a name of the location and/or coordinates of the location. The boundaries of the user-defined space may form a geo-fence. A geo-fence may include a virtual perimeter for a real-world geographic area. The coordinates defining the boundaries of the user-defined space may form the geo-fence.

The operation component may be configured to obtain a user-defined operation associated with the user-defined space. The user-defined operation may include one or more of an aerial maneuver, a capture operation, and/or other user-defined operations. Upon forming the geo-fence, as discussed above, if a current location of a UAV in flight enters or crosses over the boundaries associated with the geo-fence (e.g., the virtual perimeter of the boundaries of the user-defined space) of one or more of the user-defined spaces, the UAV may be triggered to perform an aerial maneuver, a capture operation, and/or other operations associated with that particular geo-fence defined by the user.

The position component may be configured to track position of the UAV during an unmanned aerial flight. The UAV may be in flight at a particular altitude, longitude, latitude, geographical location, heading, and/or speed. The position component may be configured to track position of the UAV based upon a GPS and/or other location tracking system associated with the UAV to determine the altitude, longitude, latitude, geographical location, heading, and/or speed of the UAV. The flight path of the UAV may have been defined prior to flight. The flight path of the UAV may be controlled via a remote controller. If the flight path of the UAV was defined prior to flight, a user may manually override the defined flight path via the remote controller.

The feedback component may be configured to, responsive to a determination that the UAV is within a predefined distance of entering the user-defined space, generate alert information indicating the UAV is within the predefined distance of entering the user-defined space. The alert information may indicate the location and/or position of the UAV. The alert information may indicate the location and/or position of the boundaries of one or more nearby user-defined spaces. The alert information may indicate how much time may be left before the UAV enters the user-defined space. The predefined distance may be received by a user and/or predefined by the system. For example, the feedback component may be configured to generate alert information when the UAV is within 20 feet of entering a user-defined space.

Generating the alert information may include generating instructions to present a notification within one or more client computing platform(s). The notification may include one or more of a graphical notification, an audible notification, a sensory notification, and/or other types of notifications. For example, the notification may include an alert message presented within a display associated with the client computing platform(s). The notification, for example, may include an alert sound audible to the user. An example sensory notification may include a vibration and/or light notification. The notification may indicate to the user that the UAV may be close to entering a user-defined space.

During flight, the UAV may enter the user-defined space. Responsive to the UAV entering the user-defined space, the control component may be configured to automatically control the UAV to perform the user-defined operation associated with the particular user-defined space. The user-defined operation may include an aerial maneuver, a capture operation, and/or other user-defined operation that may be associated with a particular user-defined space. For example, the UAV may be in flight traveling at a particular altitude, longitude, latitude, geographical location, heading, and/or speed. As the UAV is in flight, it may enter the user-defined space (e.g., the geo-fence) by crossing a virtual boundary that may form the geo-fence.

The system may be configured to effectuate transmission of instructions to the UAV. The instructions may include the user-defined operation. The instructions may be configured to cause the UAV to be controlled to perform the user-defined operation.

The aerial maneuver may include a change in one or more of an altitude, a longitude, a latitude, a geographical location, a heading, a speed of the UAV, and/or other aspects of the flight of the UAV. Current flight control settings may be determined based upon current flight control information (e.g., an altitude at which the UAV is flying, a speed at which the UAV is traveling, etc.). For example, the aerial maneuver may include a change in the direction the UAV is traveling. The UAV may gain or lose elevation in response to entering the user-defined space. The UAV may perform one or more aerobatics tricks in response to entering the user-defined space. The control component may be configured to control the UAV to change the speed at which the UAV is traveling upon entering the user-defined space. The UAV may be controlled to simply hover at the boundary of the user-defined space rather than continue traveling in a particular direction or speed based upon the user-defined operation associated with the user-defined space.

The user-defined operation may include a capture operation for the sensor control subsystem of the UAV. The sensor control subsystem may be configured to control the sensor of the UAV to perform the capture operation through adjustments of one or more of an aperture timing, an exposure, a focal length, an angle of view, a depth of field, a focus, a light metering, a white balance, a resolution, a frame rate, an object of focus, a capture angle, a zoom parameter, a video format, a sound parameter, a compression parameter, and/or other aspects of operation of the sensor control subsystem.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

The disclosure relates to controlling an unmanned aerial vehicle ("UAV") based upon previously defined operations for specific locations into which the unmanned aerial vehicle travels, in accordance with one or more implementations. The locations may be user-defined. For example, a user may define boundaries to define a space at a location. The boundaries of the user-defined space may be fixed with respect to some reference frame, such as the geography of the Earth. An operation to be performed by the UAV may be associated with the user-defined space. This association may be, for example, a result of user definition. The user-defined operation may include an aerial maneuver, such as an aerobatics trick, a capture operation, such as zooming in or out of a shot, and/or other user-defined operations. A position of the UAV may be tracked during an unmanned aerial flight. Responsive to the UAV entering the user-defined space, the UAV may be automatically controlled to perform the user-defined operation.

Figure 1:
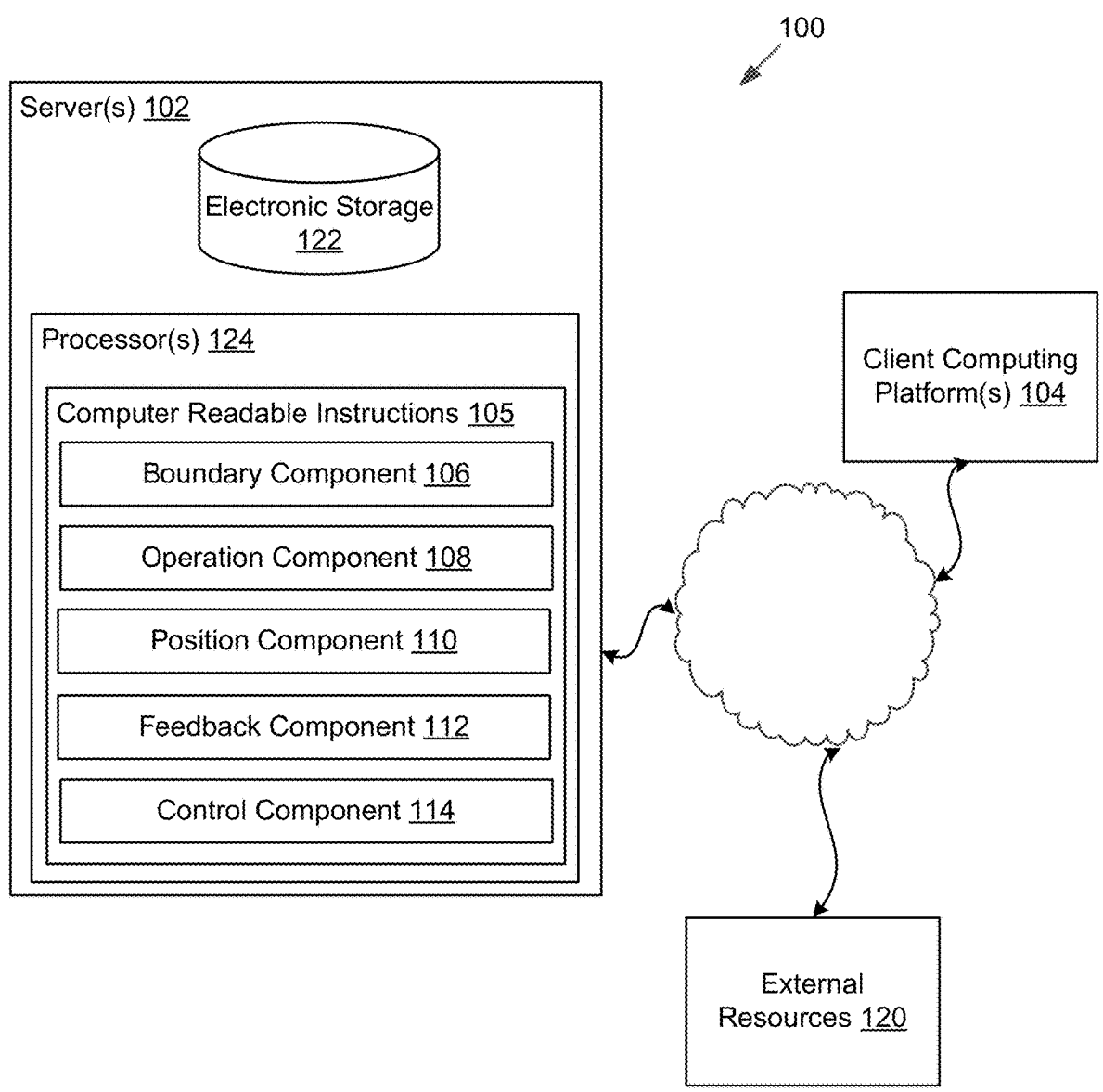
FIG. 1 illustrates a system for controlling an unmanned aerial vehicle, in accordance with one or more implementations.

FIG. 1 illustrates a system 100 for controlling an unmanned aerial vehicle, in accordance with one or more implementations. As is illustrated in FIG. 1, system 100 may include one or more servers 102. Server(s) 102 may be configured to communicate with one or more client computing platform(s) 104 according to a client/server architecture. The users of system 100 may access system 100 via client computing platform(s) 104. Server(s) 102 may be configured to execute one or more computer program components. The computer program components may include one or more of boundary component 106, operation component 108, position component 110, feedback component 112, control component 114, and/or other components.

Boundary component 106 may be configured to obtain boundaries of a user-defined space. The boundaries of the user-defined space may be fixed with respect to some reference frame. The reference frame may be the geography of the Earth. The reference frame may include a coordinate system. For the example, the coordinate system may include the Cartesian coordinate system, the polar coordinate system, a cylindrical coordinate system, and/or other coordinate systems.

Boundary component 106 may receive a location where the UAV may be in operation via a user input. The user input may be received from one or more client computing platform(s) 104. Boundary component 106 may be configured to automatically determine the location based upon a location of one or more client computing platform(s) 104 via a GPS and/or other location tracking system associated with one or more client computing platform(s) 104. Client computing platform(s) 104 may include one or more of a cellular telephone, a smartphone, a digital camera, a laptop, a tablet computer, a desktop computer, a television set-top box, a smart TV, a gaming console, a remote controller, and/or other client computing platforms. Boundary component 106 may be configured to automatically determine the location based upon a location of the UAV via a GPS and/or other location tracking system associated with the UAV. The location may include a name of the location and/or coordinates of the location.

The location may include an address, a zip code, a city, a state, a street, a building, and/or any other location. A repository of maps may be available via system 100. System 100 may retrieve one or more maps of the Earth that include the location. System 100 may be configured to effectuate presentation, via a user interface associated with client computing platform(s) 104, of the one or more maps that include the location. Display of the one or more maps that include the location may include an area surrounding the location. The areas surrounding the location that may be displayed may include a dynamic radius of a particular length that may be changed. System 100 may allow a user to move and/or scroll the one or more maps in different directions (e.g., left, right, up, and/or down) in order to display different portions of the one or more maps. System 100 may allow a user to zoom in and/or out of particular locations and/or regions of the map in order to display the one or more maps in greater or less detail.

Boundary component 106 may be configured to obtain boundaries of a user-defined space within the display based upon user interaction with the map (and/or some other presentation of the location) displayed via the user interface associated with client computing platform(s) 104. Boundary component 106 may effectuate presentation of one or more geometric shapes via the display associated with client computing platform(s) 104. The one or more geometric shapes may include a circle, a square, an oval, a rectangle, and/or other geometric shapes. Boundary component 106 may be configured to obtain a selection of the one or more geometric shapes. The user may use the user interface to visually drag and/or drop the one or more geometric shapes within an area of the map in which the user would like to set the boundaries of the user-defined space. The user may indicate or select a specific point or area, and boundaries in some default shape and/or size may be associated with the specific point to create the user-defined space. In this, and other user definition schemes, the boundaries may not be presented to the user. That is, in selecting some point or area without affirmatively setting, or even being made aware (e.g., through display) of the boundaries, such boundaries may still be "user-defined" for the purposes of this disclosure.

In some embodiments, boundary component 106 may be configured to obtain boundaries of a user-defined space from a UAV flying within a geographical space. The UAV may be controlled by a user via a remote controller. The UAV may track positional data and transmit the positional data back to system 100 such that boundary component 106 may obtain the boundaries from the UAV for a later flight. The user-defined space may be defined by a radius of a particular length around where the UAV is hovering. Such information may be transmitted to system 100 to store as the user-defined space for a later flight. The user-defined space may be defined by a user traveling (e.g., walking, jogging, driving, etc.) along the boundaries while carrying a tracking device that may track the boundaries of the user-defined space as the user travels. The user-defined space may be defined by segmentation of images that may be perceived by a capture camera.

Boundary component 106 may be configured to obtain a customizable geometric shape. For example, boundary component 106 may be configured to effectuate presentation of line segments. The user may select and/or place the line segments within the map via the user interface to form one or more geometric shapes. If the line segments placed within the map do not form an enclosed area, boundary component 106 may be configured to provide an error message.

Boundary component 106 may be configured to obtain customization of the boundaries once the one or more geometric shapes have been placed within the map. For example, the user may expand and/or otherwise manipulate the boundaries. The user may reposition the one or more geometric shapes from a first location to a second location within the map. Boundary component 106 may be configured to obtain more than one user-defined space. Other schemes for facilitating user-definition of boundaries are anticipated, and the specific implementations described herein are not intended to be limiting.

Boundary component 106 may be configured to fix the boundaries of the user-defined space with respect to some reference frame. As discussed above, the boundaries of the user-defined space may be defined by a coordinate system, such as the Cartesian coordinate system. The Cartesian coordinate system may include a longitude value and a latitude value. As such, the boundaries of the user-defined space may be defined by Cartesian coordinates with respect to the geography of the Earth. The boundaries may be fixed with respect to a moving object or an object that may move. As such, as the object moves, the fixed boundaries may remain the same around the moving object.

Boundary component 106 may be configured to store the boundaries of the user-defined space. The boundaries of the user-defined space may be stored within electronic storage 122 and/or an external storage device. As such, boundary component 106 may obtain previously stored boundaries of user-defined spaces for future use. For example, the user-defined space may be associated with a map and/or a particular location. The map may be obtained with the stored boundaries of the user-defined space for ease of future use. The user may add previously stored boundaries of a user-defined space on a fresh map without prior boundaries associated with the map. The user may add previously stored boundaries of a user-defined space on a previously stored map with existing boundaries of one or more user-defined spaces. The user may add, modify, and/or delete the previously stored boundaries of the user-defined space at any time, including before, during, and/or after flight of the UAV.

The boundaries of the user-defined space may form a geo-fence. A geo-fence may include a virtual perimeter for a real-world geographic area. The coordinates defining the boundaries of the user-defined space may form the geo-fence. For example, the Cartesian coordinate values that define the boundaries of the user-defined space may form the geo-fence.

Figure 2:
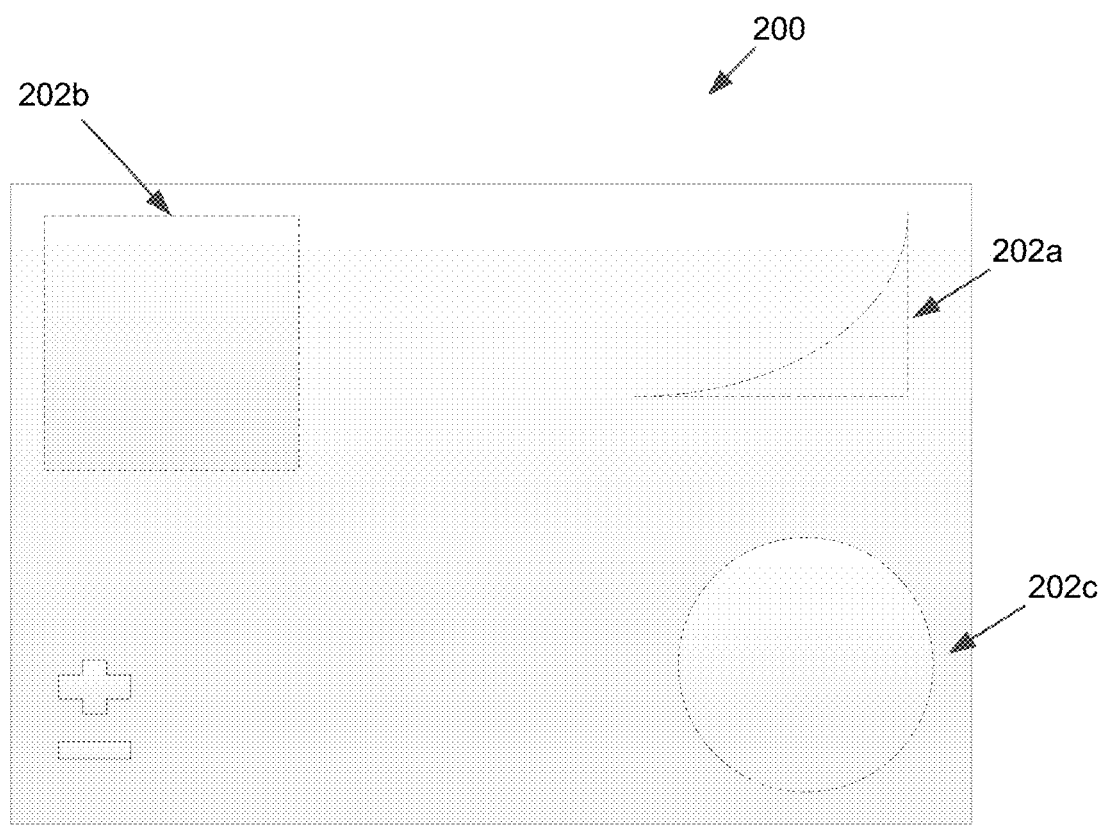
FIG. 2 illustrates an exemplary depiction of a map including boundaries of user-defined spaces, in accordance with one or more implementations.

For example, referring to FIG. 2, interactive map 200 is shown. Interactive map 200 may be displayed via a user interface associated with one or more client computing platform(s) 104. Interactive map 200 may be moved to display other portions of interactive map 200 via the user interface associated with one or more client computing platform(s) 104. The user may zoom in and/or out of interactive map 200 in order to display more or less of interactive map 200 with reference to a center point of interactive map 200.

Interactive map 200 is shown to include user-defined spaces 202a, 202b, and 202c. Interactive map 200 may include any number of user-defined spaces. The boundaries of user-defined spaces 202a, 202b, and 202c may be fixed with respect to the geography of the Earth based upon the area of the user-defined space within interactive map 200. For example, a skateboard ramp, a house, and a volleyball court may be located within the display of interactive map 200. User-defined space 202a may include boundaries which surround a portion or all of the skateboard ramp. User-defined space 202b may include boundaries which surround a portion or all of the house. User-defined space 202c may include boundaries which surround a portion or all of the volleyball court. As discussed above, the boundaries may be defined by coordinate values. The user may manipulate user-defined spaces 202a, 202b, and/or 202c by placing any one of them in another location within interactive map 200, by increasing or decreasing the area associated with one of them, and/or by making other changes via interactive map 200. For example, a user may remove user-defined space 202a and expand user-defined space 202c to include both the skateboard ramp and the volleyball court in a single user-defined space, such that boundaries of the single user-defined space surround a portion or all of the skateboard ramp and/or the volleyball court.

Operation component 108 may be configured to obtain a user-defined operation associated with the user-defined space. The user-defined operation may include one or more of an aerial maneuver, a capture operation, and/or other user-defined operations. The user-defined operation associated with the user-defined space may indicate whether the user-defined space may be an inclusive or an exclusive zone for the UAV (e.g., a geo-fence versus a no fly zone). Upon forming the geo-fence, as discussed above, if a current location of a UAV in flight enters or crosses over the boundaries associated with the geo-fence (e.g., the virtual perimeter of the boundaries of the user-defined space) of one or more of the user-defined spaces, the UAV may be triggered to perform an aerial maneuver, a capture operation, and/or other operations associated with that particular geo-fence defined by the user.

Figure 3:
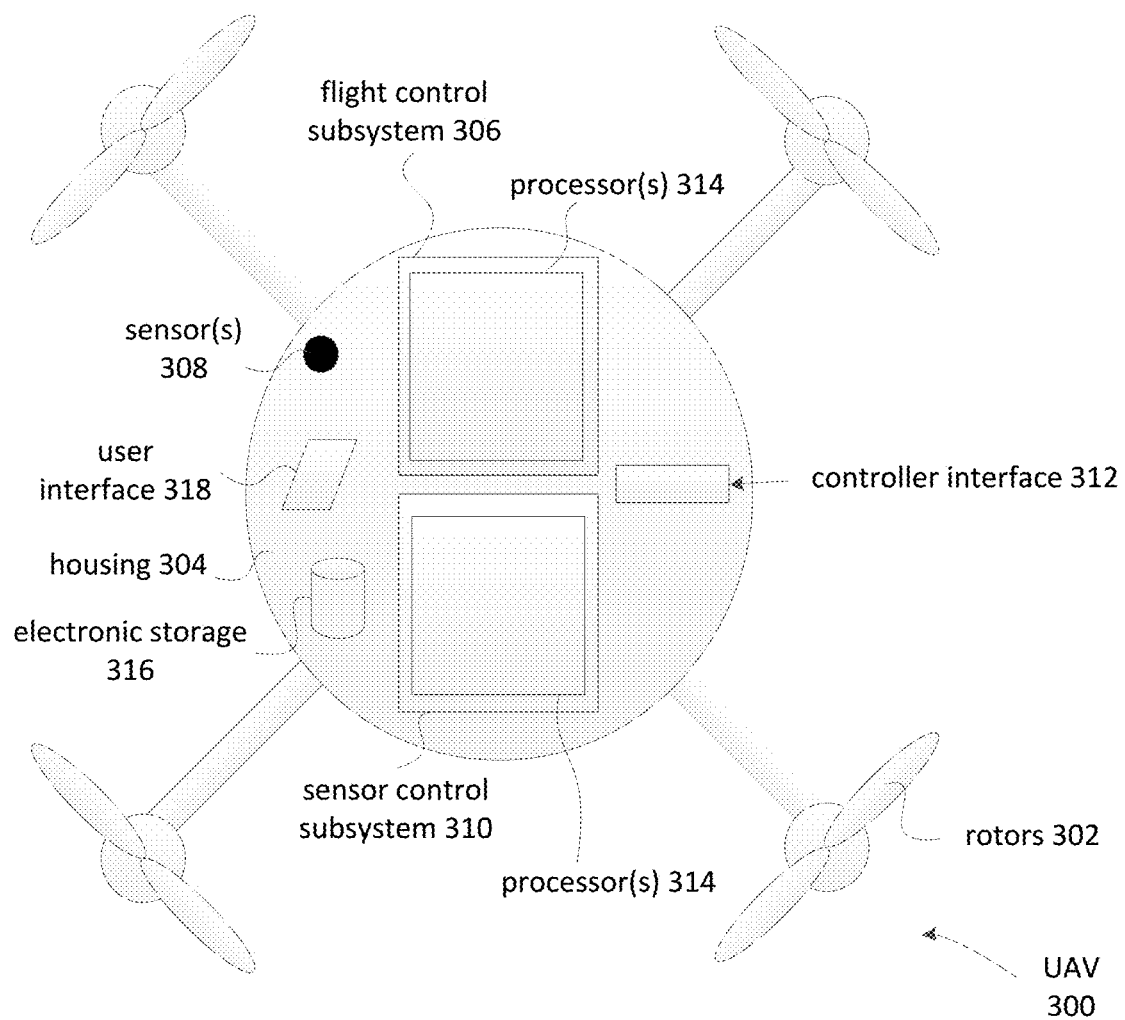
FIG. 3 illustrates an unmanned aerial vehicle in accordance with one or more implementations.

Referring to FIG. 3, unmanned aerial vehicle 300 (also referred to herein as UAV 300) is illustrated. While UAV 300 is shown as a quadcopter, this is for exemplary purposes only and is not meant to be a limitation of this disclosure. As illustrated in FIG. 3, UAV 300 may include four rotors 302. The number of rotors of UAV 300 is not meant to be limiting in anyway, as UAV 300 may include any number of rotors. UAV 300 may include one or more of housing 304, flight control subsystem 306, one or more sensors 308, sensor control subsystem 310, controller interface 312, one or more physical processors 314, electronic storage 316, user interface 318, and/or other components. In some implementations, a remote controller (not shown) may be available as a beacon to guide and/or control UAV 300.

Housing 304 may be configured to support, hold, and/or carry UAV 300 and/or components thereof.

Flight control subsystem 306 may be configured to provide flight control for UAV 300. Flight control subsystem 306 may include one or more physical processors 314 and/or other components. Operation of flight control subsystem 306 may be based on flight control settings and/or flight control information. Flight control information may be based on information and/or parameters determined and/or obtained to control UAV 300. In some implementations, providing flight control settings may include functions including, but not limited to, flying UAV 300 in a stable manner, tracking people or objects, avoiding collisions, and/or other functions useful for autonomously flying UAV 300. In some implementations, flight control information may be transmitted by a remote controller. In some implementations, flight control information and/or flight control settings may be received by controller interface 312. The flight control settings may include one or more of an altitude, a longitude, a latitude, a geographical location, a heading, and/or a speed UAV 300.

Sensor control subsystem 310 may include one or more physical processors 314 and/or other components. While single sensor 308 is depicted in FIG. 3, this is not meant to be limiting in any way. UAV 300 may include any number of sensors. Sensor 308 may include an image sensor. Sensor 308 may be configured to generate an output signal conveying visual information (e.g., an image and/or video segment) within a field of view. The visual information may include video information, audio information, geolocation information, orientation and/or motion information, depth information, and/or other information. The visual information may be marked, timestamped, annotated, and/or otherwise processed such that information captured by sensor(s) 308 may be synchronized, aligned, annotated, and/or otherwise associated therewith. Sensor control subsystem 310 may be configured to control one or more sensor(s) 308 through adjustments of an aperture timing, an exposure, a focal length, an angle of view, a depth of field, a focus, a light metering, a white balance, a resolution, a frame rate, an object of focus, a capture angle, a zoom parameter, a video format, a sound parameter, a compression parameter, and/or other sensor controls.

User interface 318 of UAV 300 may be configured to provide an interface between UAV 300 and a user (e.g. a remote user using a graphical user interface) through which the user may provide information to and receive information from UAV 300. This enables data, results, and/or instructions and any other communicable items to be communicated between the user and UAV 300, such as flight control settings and/or image sensor controls. Examples of interface devices suitable for inclusion in user interface 318 may include a keypad, buttons, switches, a keyboard, knobs, levers, a display screen, a touch screen, speakers, a microphone, an indicator light, an audible alarm, and a printer. Information may be provided to a user by user interface 318 in the form of auditory signals, visual signals, tactile signals, and/or other sensory signals.

It is to be understood that other communication techniques, either hard-wired or wireless, may be contemplated herein as user interface 318. For example, in one embodiment, user interface 318 may be integrated with a removable storage interface provided by electronic storage 316. In this example, information is loaded into UAV 300 from removable storage (e.g., a smart card, a flash drive, a removable disk, etc.) that enables the user(s) to customize UAV 300. Other exemplary input devices and techniques adapted for use with UAV 300 as user interface 318 may include, but are not limited to, an RS-232 port, RF link, an IR link, modem (telephone, cable, Ethernet, internet or other). In short, any technique for communicating information with UAV 300 may be contemplated as user interface 318.

Referring to FIGS. 2 and 3, position component 110 may be configured to track position of UAV 300 during an unmanned aerial flight. As discussed above, UAV 300 may be in flight at a particular altitude, longitude, latitude, geographical location, heading, and/or speed. Position component 110 may be configured to track position of UAV 300 based upon a GPS and/or other location tracking system associated with UAV 300 to determine the altitude, longitude, latitude, geographical location, heading, and/or speed of UAV 300. The flight path of UAV 300 may have been defined prior to flight. As discussed above, the flight path of UAV 300 may be controlled via a remote controller. If the flight path of UAV 300 was defined prior to flight, a user may manually override the defined flight path via the remote controller.

Referring back to FIG. 1, feedback component 112 may be configured to, responsive to a determination that the UAV is within a predefined distance of entering the user-defined space, generate alert information indicating the UAV is within the predefined distance of entering the user-defined space. The alert information may indicate the location and/or position of the UAV. The alert information may indicate the location and/or position of the boundaries of one or more nearby user-defined spaces. The alert information may indicate how much time may be left before the UAV enters the user-defined space. The predefined distance may be received by a user and/or predefined by system 100. For example, feedback component 112 may be configured to generate alert information when the UAV is within 20 feet of entering a user-defined space.

Feedback component 112 may be configured to effectuate transmission of the alert information over the network to one or more client computing platform(s) 102 and/or a remote device.

The alert information may include a likelihood of the UAV to enter the user-defined space. The likelihood of the UAV to enter the user-defined space may be determined based upon a predicted path of the UAV traveling at the current speed, altitude, longitude, latitude, and/or direction. The likelihood of the UAV may be a numerical value (e.g., 1, 2, . . . n, where a number may be assigned as low and/or high) and/or verbal levels (e.g., very low, low, medium, high, very high, and/or other verbal levels).

Generating the alert information may include generating instructions to present a notification within one or more client computing platform(s) 104. The notification may include one or more of a graphical notification, an audible notification, a sensory notification, and/or other types of notifications. For example, the notification may include an alert message presented within a display associated with the client computing platform(s) 104. The notification, for example, may include an alert sound audible to the user. An example sensory notification may include a vibration and/or light notification. The notification may indicate to the user that the UAV may be close to entering a user-defined space.

A graphical notification may be presented within a display associated with one or more client computing platform(s) 104. The graphical notification may be presented within the display as an overlay. An audible notification may include a notification sound played by a speaker, within one or more earphones, within one or both sides of headphones, and/or other audible notifications. A sensory notification may be delivered via client computing platform(s) 104, one or more display devices associated with client computing platform(s) 104, one or more control (e.g., user interfacing) devices associated with client computing platform(s) 104, and/or other devices.

The notification may include a distance between the position of the UAV and the UAV entering the user-defined space. The notification may indicate a current location of the UAV, a predicted flight path of the UAV, boundaries of one or more user-defined spaces, other objects within the area of the UAV, a predicted length of time before the UAV enters the user-defined space, and/or other notifications. For example, a graphical notification may include "Virtual boundary in 20 feet!" The graphical notification may include an arrow pointing in the direction the user-defined space is located relative to the direction the UAV is traveling. An audible notification, for example, may include a spoken message of "Virtual boundary in 20 feet straight ahead". A sound may be played in the right ear of the user to indicate to the user that the user-defined space is located to the right relative to the UAV. The sound may be played in the left ear of the user to indicate to the user that the user-defined space is located to the left relative to the UAV.

The notification may include different colors representing different distances between the position of the UAV and the UAV entering the user-defined space. For example, red may indicate that the UAV is within 0-5 feet of entering the user-defined space. Yellow may indicate that the UAV is within 5-15 feet of entering the user-defined space. Green may indicate that the UAV is more than 15 feet away from entering the user-defined space. The examples above are for illustrative purposes only and are not meant to be limiting in any way. Any color may be used to represent any distance and/or length of time before the UAV enters the user-defined space.

Responsive to the alert information, control component 114 may be configured to allow a user to override control of the UAV. For example, a user may use a remote controller to provide flight controls to the UAV such that the UAV will not enter the user-defined space, enter the user-defined space from a difference direction, and/or other flight controls.

Referring to FIGS. 1-3, during flight, UAV 300 may enter the user-defined space (e.g., one of user-defined spaces 202a, 202b, and/or 202c). Responsive to UAV 300 entering the user-defined space (e.g., one of user-defined spaces 202a, 202b, and/or 202c), control component 114 may be configured to automatically control UAV 300 to perform the user-defined operation associated with the particular user-defined space. The user-defined operation may include an aerial maneuver, a capture operation, and/or other user-defined operation that may be associated with a particular user-defined space. For example, UAV 300 may be in flight traveling at a particular altitude, longitude, latitude, geographical location, heading, and/or speed. As UAV 300 is in flight, it may enter the user-defined space (e.g., the geo-fence) by crossing a virtual boundary that may form the geo-fence.

System 100 may be configured to effectuate transmission of instructions to UAV 300. The instructions may include the user-defined operation. The instructions may be configured to cause UAV 300 to be controlled to perform the user-defined operation.

The aerial maneuver may include a change in one or more of an altitude, a longitude, a latitude, a geographical location, a heading, and/or a speed of UAV 300. Current flight control settings may be determined based upon current flight control information (e.g., an altitude at which UAV 300 is flying, a speed at which UAV 300 is traveling, etc.).

For example, the aerial maneuver may include a change in the direction UAV 300 is traveling. Responsive to UAV 300 entering the user-defined space, control component 114 may be configured to control UAV 300 to reverse its direction from the direction it was traveling when UAV 300 entered the user-defined space. UAV 300 may gain or lose elevation in response to entering the user-defined space.

UAV 300 may perform one or more aerobatics tricks in response to entering the user-defined space. For example, control component 114 may be configured to control UAV 300 to do one or more flips (e.g., an upward or downward 360° flip), rotate to the left or right, perform an aerial dive, and/or other aerobatics tricks.

Control component 114 may be configured to control UAV 300 to change the speed at which UAV 300 is traveling upon entering the user-defined space. For example, UAV 300 may be controlled to travel slower or faster than the speed at which UAV 300 traveled at the time of entering the user-defined space. UAV 300 may be controlled to simply hover at the boundary of the user-defined space rather than continue traveling in a particular direction or speed based upon the user-defined operation associated with the user-defined space.

The user-defined operation may include conditional statements. For example, the user-defined operation may include an instruction that states that if UAV 300 is traveling less than 10 miles per hour at the time of entering the user-defined space, then control component 114 may be configured to increase the speed of UAV 300 to 10 miles per hour upon entering the user-defined space.

The user-defined operation may include a capture operation for the sensor control subsystem of UAV 300. The sensor control subsystem may be configured to control the sensor of UAV 300 to perform the capture operation through adjustments of one or more of an aperture timing, an exposure, a focal length, an angle of view, a depth of field, a focus, a light metering, a white balance, a resolution, a frame rate, an object of focus, a capture angle, a zoom parameter, a video format, a sound parameter, and/or a compression parameter.

A position of UAV 300 may impact capture of an image and/or video segment. For example, an altitude in which UAV 300 is flying and/or hovering may impact the visual information captured by sensor(s) 308 (e.g., the visual information may be captured at different angles based upon the altitude of UAV 300). A speed and/or direction in which UAV 300 is flying may capture different visual information.

More than one user-defined operation may be associated with any particular user-defined space. For example, a single user-defined space may be associated with two user-defined operations, such as an aerial maneuver and a capture operation, two aerial maneuvers, two capture operations, and/or other user-defined operations.

Figure 4:
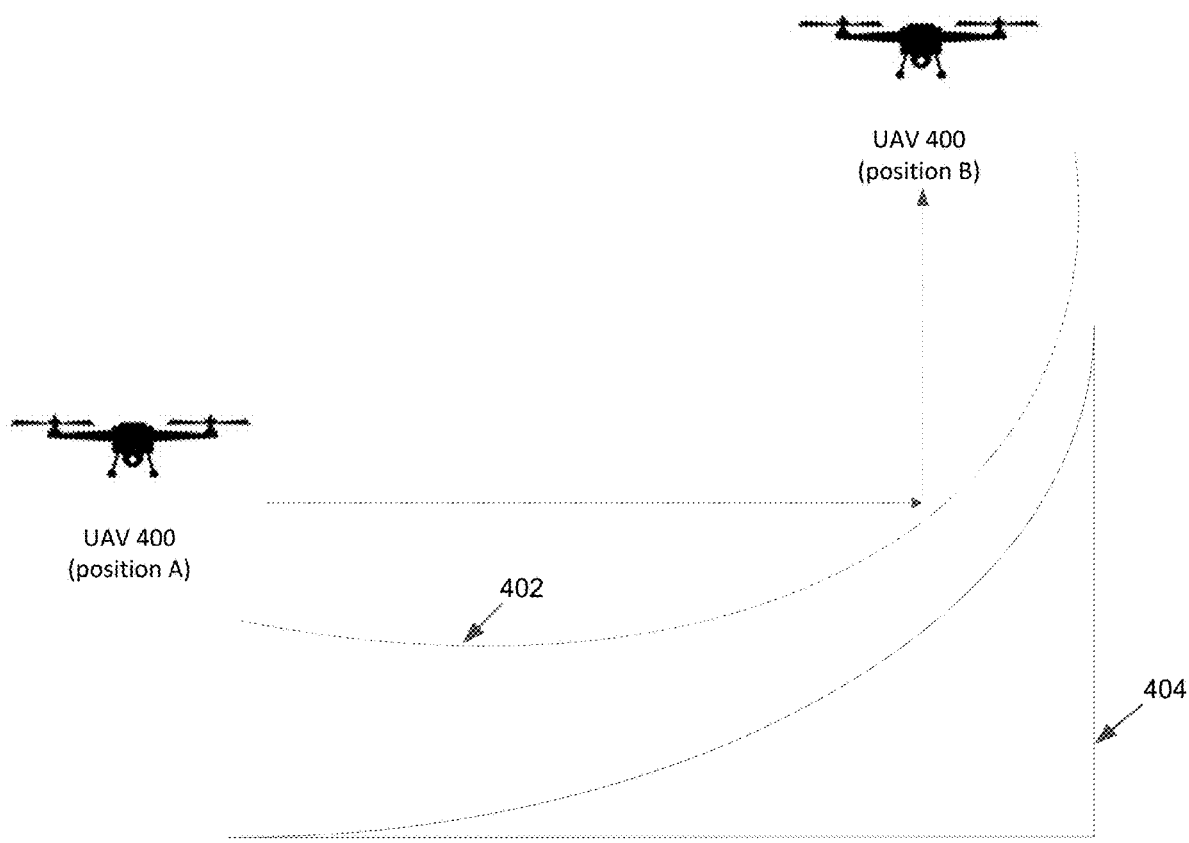
FIG. 4 illustrates an exemplary flight path of an unmanned aerial vehicle, in accordance with one or more implementations.

Referring to FIG. 4, UAV 400 is depicted in flight approaching a boundary of user-defined space 402. User-defined space 402 may include skateboarding ramp 404. UAV 400 may be located in a first position (e.g., position A). UAV 400 may begin capturing a video of a skateboarder on skateboard ramp 404 while UAV 400 is in flight moving towards the boundary of user-defined space 402. The current flight control settings of UAV 400 may include the last set of flight control settings when UAV 400 was last in use, pre-configured flight control settings by UAV 400, manual configuration of the flight control settings by the user, and/or other current settings of UAV 400. Upon UAV 400 entering user-defined space 402 by crossing over the boundary of user-defined space 402, control component 114 may be configured to automatically control UAV 400 to perform a user-defined operation associated with user-defined space 402. For example, the user-defined operation may include an aerial maneuver by controlling UAV 300 to no longer travel forward, but rather to travel upwards (e.g., position B), therefore capturing the skateboarder from the top. The user-defined operation may further include that once UAV 300 reaches 15 feet above the ground, UAV 300 is to hover in that location while zoomed into the object (e.g., skateboard ramp 404) within user-defined space 402 for 2.5 seconds, and then pans out to a wide-angle after 2.5 seconds while still hovering at 15 feet.

Referring back to FIG. 1, as discussed above, a remote controller may be configured to manually override the user-defined operation. For example, if control component 114 automatically controls the UAV to perform the user-defined operation upon entering the user-defined space, the user may override control component 114 via a remote controller to control the UAV by the user. For example, if an unexpected tree branch obstructs the UAV from performing the user-defined operation, the user may override the UAV by automatically controlling the UAV via the remote controller to avoid damage to the UAV.

Referring again to FIG. 1, in some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable a producer and/or user associated with the given client computing platform 104 to interface with system 100 and/or external resources 120, and/or provide other functionality attributed herein to client computing platform(s) 104.

External resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may include electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute computer readable instruction components 106, 108, 110, 112, and/or other components. The processor(s) 124 may be configured to execute components 106, 108, 110, 112, and/or other components by software; hardware; firmware; some combination of software, hardware, and/or firmware; and/or other mechanisms for configuring processing capabilities on processor(s) 124.

It should be appreciated that although components 106, 108, 110, 112, and 114 are illustrated in FIG. 1 as being co-located within a single processing unit, in implementations in which processor(s) 124 includes multiple processing units, one or more of components 106, 108, 110, 112, and/or 114 may be located remotely from the other components. The description of the functionality provided by the different components 106, 108, 110, 112, and/or 114 described herein is for illustrative purposes, and is not intended to be limiting, as any of components 106, 108, 110, 112, and/or 114 may provide more or less functionality than is described. For example, one or more of components 106, 108, 110, 112, and/or 114 may be eliminated, and some or all of its functionality may be provided by other ones of components 106, 108, 110, 112, and/or 114. As another example, processor(s) 124 may be configured to execute one or more additional components that may perform some or all of the functionality attributed herein to one of components 106, 108, 110, 112, and/or 114.

Figure 5:
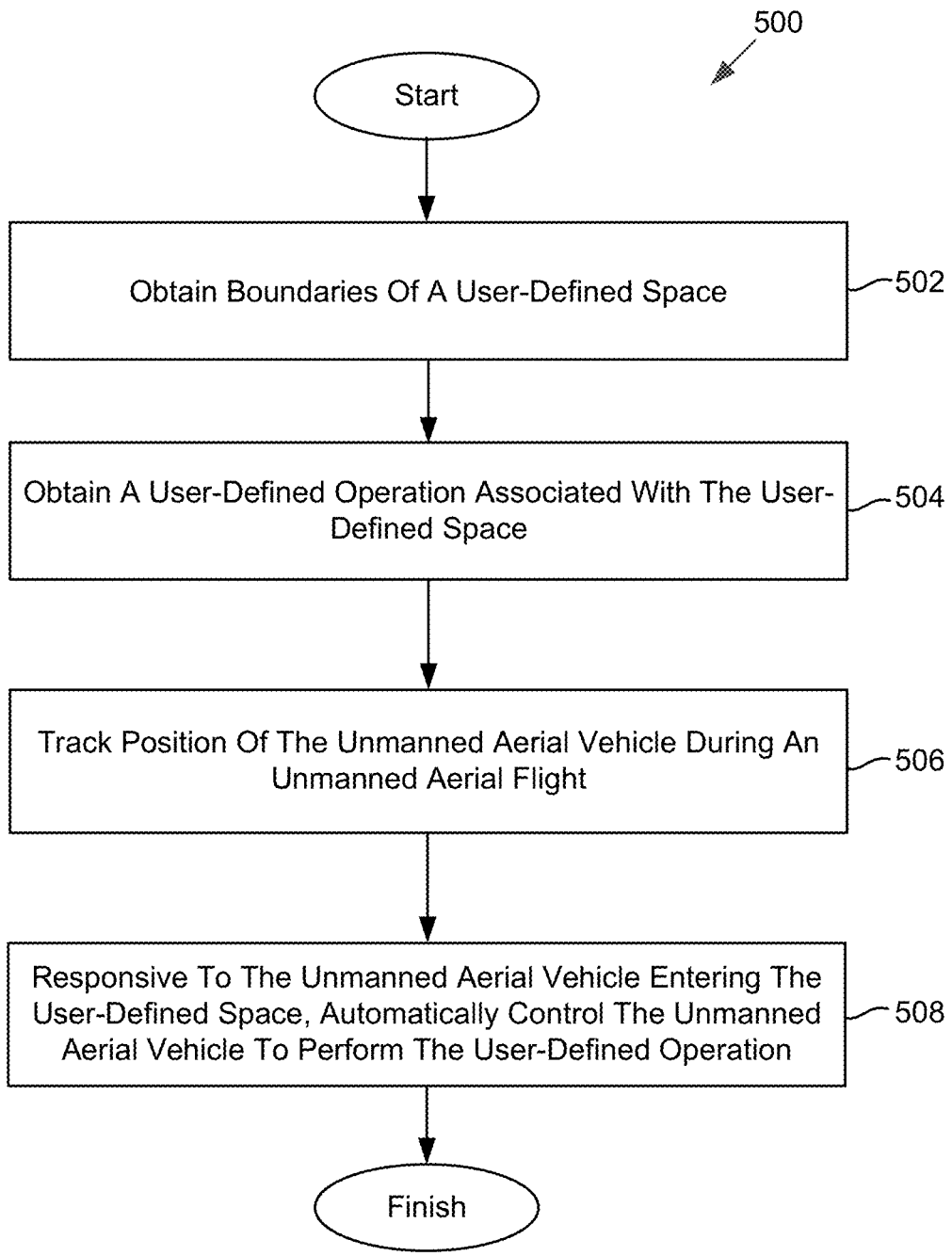
FIG. 5 illustrates a method for controlling an unmanned aerial vehicle, in accordance with one or more implementations.

FIG. 5 illustrates a method 500 for controlling an unmanned aerial vehicle, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, boundaries of a user-defined space may be obtained. Operation 502 may be performed by a boundary component that is the same as or similar to boundary component 106, in accordance with one or more implementations.

At an operation 504, a user-defined operation associated with the user-defined space may be obtained. Operation 504 may be performed by an operation component that is the same as or similar to operation component 108, in accordance with one or more implementations.

At an operation 506, a position of the unmanned aerial vehicle may be tracked during an unmanned aerial flight. Operation 506 may be performed by a position component that is the same as or similar to position component 110, in accordance with one or more implementations.

At an operation 508, responsive to the unmanned aerial vehicle entering the user-defined space, the unmanned aerial vehicle may be automatically controlled to perform the user-defined operation. Operation 508 may be performed by a control component that is the same as or similar to control component 114, in accordance with one or more implementations.

Figure 6:
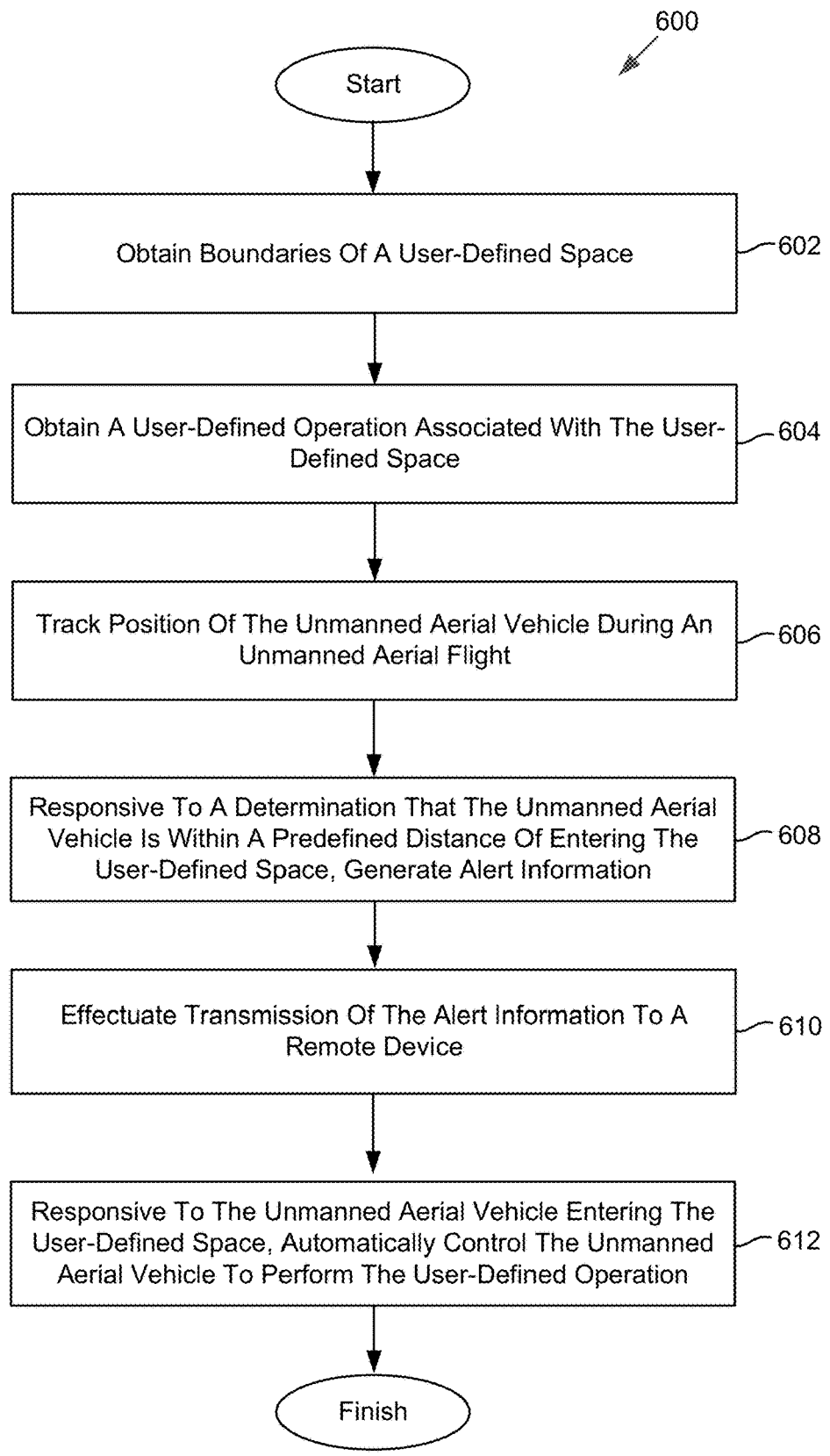
FIG. 6 illustrates a method for controlling an unmanned aerial vehicle, in accordance with one or more implementations.

FIG. 6 illustrates a method 600 for controlling an unmanned aerial vehicle, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, boundaries of a user-defined space may be obtained. Operation 602 may be performed by a boundary component that is the same as or similar to boundary component 106, in accordance with one or more implementations.

At an operation 604, a user-defined operation associated with the user-defined space may be obtained. Operation 604 may be performed by an operation component that is the same as or similar to operation component 108, in accordance with one or more implementations.

At an operation 606, a position of the unmanned aerial vehicle may be tracked during an unmanned aerial flight. Operation 606 may be performed by a position component that is the same as or similar to position component 110, in accordance with one or more implementations.

At an operation 608, responsive to a determination that the unmanned aerial vehicle is within a predefined distance of entering the user-defined space, the unmanned aerial vehicle may be automatically controlled to perform the user-defined operation. Operation 608 may be performed by a feedback component that is the same as or similar to feedback component 110, in accordance with one or more implementations.

At an operation 610, the alert information may be transmitted to a client computing platform. Operation 610 may be performed by a feedback component that is the same as or similar to feedback component 110, in accordance with one or more implementations.

At an operation 612, responsive to the unmanned aerial vehicle entering the user-defined space, the unmanned aerial vehicle may be automatically controlled to perform the user-defined operation. Operation 612 may be performed by a control component that is the same as or similar to control component 114, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for controlling an unmanned aerial vehicle, the system comprising:
    one or more physical processors configured by machine readable instructions to:
    obtain boundaries of a user-defined space, the boundaries of the user-defined space being fixed with respect to a reference frame and being set by a user by dragging and dropping one or more selected geometric shapes within an area of a map via a user interface or by specifying a point associated with a boundary including a default shape and size on the map via the user interface;
    obtain a user-defined operation associated with the user-defined space, the user-defined operation including an aerial maneuver operation and a capture operation;
    track position of the unmanned aerial vehicle during an unmanned aerial flight;
    responsive to a determination that the unmanned aerial vehicle is within a predefined distance of entering the user-defined space, generate alert information indicating the unmanned aerial vehicle is within the predefined distance of entering the user-defined space;
    effectuate transmission of the alert information to a client computing platform, wherein the alert information comprises providing a likelihood of the unmanned aerial vehicle entering the user-defined space; and
    responsive to the unmanned aerial vehicle entering the user-defined space, automatically control the unmanned aerial vehicle to perform the user-defined operation.

2. The system of claim 1, wherein generation of the alert information includes generating instructions to present a notification within the client computing platform based upon the alert information.

3. The system of claim 2, wherein the notification includes a graphical representation of the alert information.

4. The system of claim 3, wherein the graphical representation includes a distance between the position of the unmanned aerial vehicle and the unmanned aerial vehicle entering the user-defined space.

5. The system of claim 3, wherein the graphical representation includes different colors representing different distances between the position of the unmanned aerial vehicle and the unmanned aerial vehicle entering the user-defined space.

6. The system of claim 3, wherein the notification includes a predicted length of time before the unmanned aerial vehicle enters the user-defined space.

7. The system of claim 2, wherein the notification includes an audible representation of the alert information.

8. The system of claim 7, wherein the audible representation of the alert information includes an audible distance between the position of the unmanned aerial vehicle and the unmanned aerial vehicle entering the user-defined space.

9. The system of claim 1, wherein the one or more physical processors are further configured by machine readable instructions to:
    responsive to the alert information, allow a user to override control of the unmanned aerial vehicle.

10. The system of claim 1, wherein the likelihood is a verbal level selected from very low, low, medium, high, and very high.

11. A system for controlling an unmanned aerial vehicle, the system comprising:
    one or more physical processors configured by machine readable instructions to:
    obtain boundaries of a user-defined space, the boundaries of the user-defined space being fixed with respect to a reference frame and being set by a user by dragging and dropping one or more selected geometric shapes within an area of a map via a user interface or by specifying a point associated with a boundary including a default shape and size on the map via the user interface;
    obtain two or more user-defined operations associated with the user-defined space, the two or more user-defined operations including an aerial maneuver operation and a capture operation;
    track position of the unmanned aerial vehicle during an unmanned aerial flight;
    responsive to a determination that the unmanned aerial vehicle is within a predefined distance of entering the user-defined space, generate alert information indicating the unmanned aerial vehicle is within the predefined distance of entering the user-defined space;
    effectuate transmission of the alert information to a client computing platform, wherein generation of the alert information generates instructions to present a notification that comprises a predicted length of time before the unmanned aerial vehicle enters the user-defined space; and
    responsive to the unmanned aerial vehicle entering the user-defined space, automatically control the unmanned aerial vehicle to perform the two or more user-defined operations.

12. The system of claim 11, wherein the alert information includes a likelihood of the unmanned aerial vehicle to enter the user-defined space.

13. The system of claim 11, wherein the notification is presented within the client computing platform based upon the alert information.

14. The system of claim 13, wherein the notification includes a graphical representation of the alert information, the graphical representation including a distance between the position of the unmanned aerial vehicle and the unmanned aerial vehicle entering the user-defined space and including different colors representing different distances between the position of the unmanned aerial vehicle and the unmanned aerial vehicle entering the user-defined space.

15. The system of claim 13, wherein the notification includes an audible representation of the alert information, the audible representation including an audible distance between the position of the unmanned aerial vehicle and the unmanned aerial vehicle entering the user-defined space.

16. The system of claim 11, wherein the one or more physical processors are further configured by machine readable instructions to:
responsive to the alert information, allow a user to override control of the unmanned aerial vehicle.

17. The system of claim 11, wherein the reference frame includes a geography of the Earth, a Cartesian coordination system, or a polar coordinate system.

18. The system of claim 11, wherein the aerial maneuver operation includes an aerobatics trick, instructions to hover at a boundary of the user-defined space, or a change in an altitude, a longitude, a latitude, a geographical location, a heading, a direction, an elevation, and a speed of the unmanned aerial vehicle.

19. The system of claim 11, wherein the capture operation includes adjustments of an aperture timing, an exposure, a focal length, an angle of view, a depth of field, a focus, a light metering, a white balance, a resolution, a frame rate, an object of focus, a capture angle, a zoom parameter, a video format, a sound parameter, and a compression parameter of a sensor control subsystem of the unmanned aerial vehicle.

20. The system of claim 11, further comprising a position component that tracks a position of the unmanned aerial vehicle during a flight and a location tracking system to determine an altitude, longitude, latitude, geographical location, heading, and/or speed of the unmanned aerial vehicle so that the predicted length of time before the unmanned aerial vehicle enters the user-defined space is predicted based upon a flight path of the unmanned aerial vehicle.

* * * * *